United States Patent [19]
Lee et al.

[11] Patent Number: 5,634,044
[45] Date of Patent: May 27, 1997

[54] CHARGE COUPLED DEVICE CONTROL MODULE

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 282,246

[22] Filed: Jul. 29, 1994

[51] Int. Cl.$^6$ ................................................ G06F 1/04
[52] U.S. Cl. ............................. 395/559; 377/63; 395/556
[58] Field of Search ................................. 395/550, 556, 395/559; 377/57–63

[56] References Cited

U.S. PATENT DOCUMENTS

| | | | |
|---|---|---|---|
| 5,138,454 | 8/1992 | Parulski | 358/180 |
| 5,483,458 | 1/1996 | Lee et al. | 364/464.02 |
| 5,552,991 | 9/1996 | Lee et al. | 364/464.02 |

*Primary Examiner*—Thomas M. Heckler
*Attorney, Agent, or Firm*—Angelo N. Chaclas; Melvin J. Scolnick

[57] ABSTRACT

The control system controls the operation of a charge coupled device. The operation of the charge coupled device is responsive to a shift clock signal of a given frequency and a shift enable signal. The control system includes a timer for generating one of a number of shift clock signals. Each of the shift clock signals has a different frequency. A programmable register stores a plurality of control bits which may be programmed into the program memory of the control system. A multiplex switching is used for selecting one of the shift clock signals in response to the state of the control bits and directing the selected shift clock signal to the charge coupled device. An address decoder in response to addressing by the microprocessor, generates the shift enable signal which signal is directed to the charge coupled device concurrently with the presence of the selected shift clock signal.

7 Claims, 3 Drawing Sheets

CHARGE COUPLED DEVICE CONTROL MODULE

BACKGROUND OF THE INVENTION

The present invention relates to a charge coupled sensing device system and, more particularly, to a microprocessor control system, such as those used to control an electronic postage metering system, having a microprocessor controller in communication with the charge coupled device through an input-output interface.

In electronic postage meters, and other like devices, it is known to use charge coupled devices (CCD) for various sensing tasks. Particularly, it is known to use CCD for sensing various states of various components of an electronic postage meter (EMP) and conveying that sensed information to the microprocessor controller system of the electronic postage meter. Also, it is conventional to develop a unique control system for each electronic postage meter model, i.e., each meter model has a control system which incorporates a uniquely specified microprocessor, ASIC, memory devices and a variety of other electrical components. As a consequence, for each meter model, the CCD interface is uniquely specified to operate with the particular CCD to be used. Consequently, the control systems for each meter model series are relatively non-standard.

SUMMARY OF THE INVENTION

It is an object of the present invention to present a charge coupled device control module which is programmable to enable the CCD control module to functionally control any one of a variety of charge coupled devices in response to programmable control signals.

It is a further objective of the present invention to present an electronic postage meter microprocessor control system suitable for controlling the operation of a vary of electronic meter models having any one of a variety of charge coupled sensing devices associated with the operation of the electronic postage meter wherein the microprocessor control system may be easily programmed to control any one of a variety of charge coupled devices.

The control system for a EPM is comprised of a programmable microprocessor in bus communication with a plurality of non-volatile memory units for accounting for the postage printed by a printing unit responsive to the programming of the microprocessor. The programmable microprocessor is also in bus communication with a ROM or program memory, a random access memory (RAM), and an application specific integrated circuit (ASIC). The ASIC is comprised of any number of system modules, i.e., microprocessor interface module, address decoder module, interrupt controller module, clock module, timer module, non-volatile memory security module, printer module, communication module, print head controller module, graphical interface module and CCD interface module.

The ASIC further includes a plurality of addressable registers which, upon system power-up, are accessed by the microprocessor and into which the various operating parameters for each module, from the program memory, is written including the CCD interface. Also during power-up, the microprocessor writes data to certain ones of the ASIC registers which set certain operating mode states for internal ASIC function. The programmability of the ASIC in this manner allows for ASIC module customizing, including the CCD interface module, under software control for the particular postage metering system. In this manner, a standard ASIC may be used in the control system for facilitating system control for a variety of meter models and configurations.

The CCD sensor interface module generates a programmable pixel clock and a data transfer pulse to the CCD sensor device. It also provides a 64-bit buffer to allow collection of pixel information from the CCD sensor device and to transfer them to a memory under microprocessor control. The pixel clock is programmable for 1MKHz, 500KHz, 250KHz, 125KHz or 62.5KHz. The data transfer pulse is fixed for 2048 effective pixels. The 64-bit buffer is double-buffered to facilitate uninterrupted collection of the pixel information.

DETAILED DESCRIPTION OF THE PREFERRED EMBODIMENT

Figure 1:
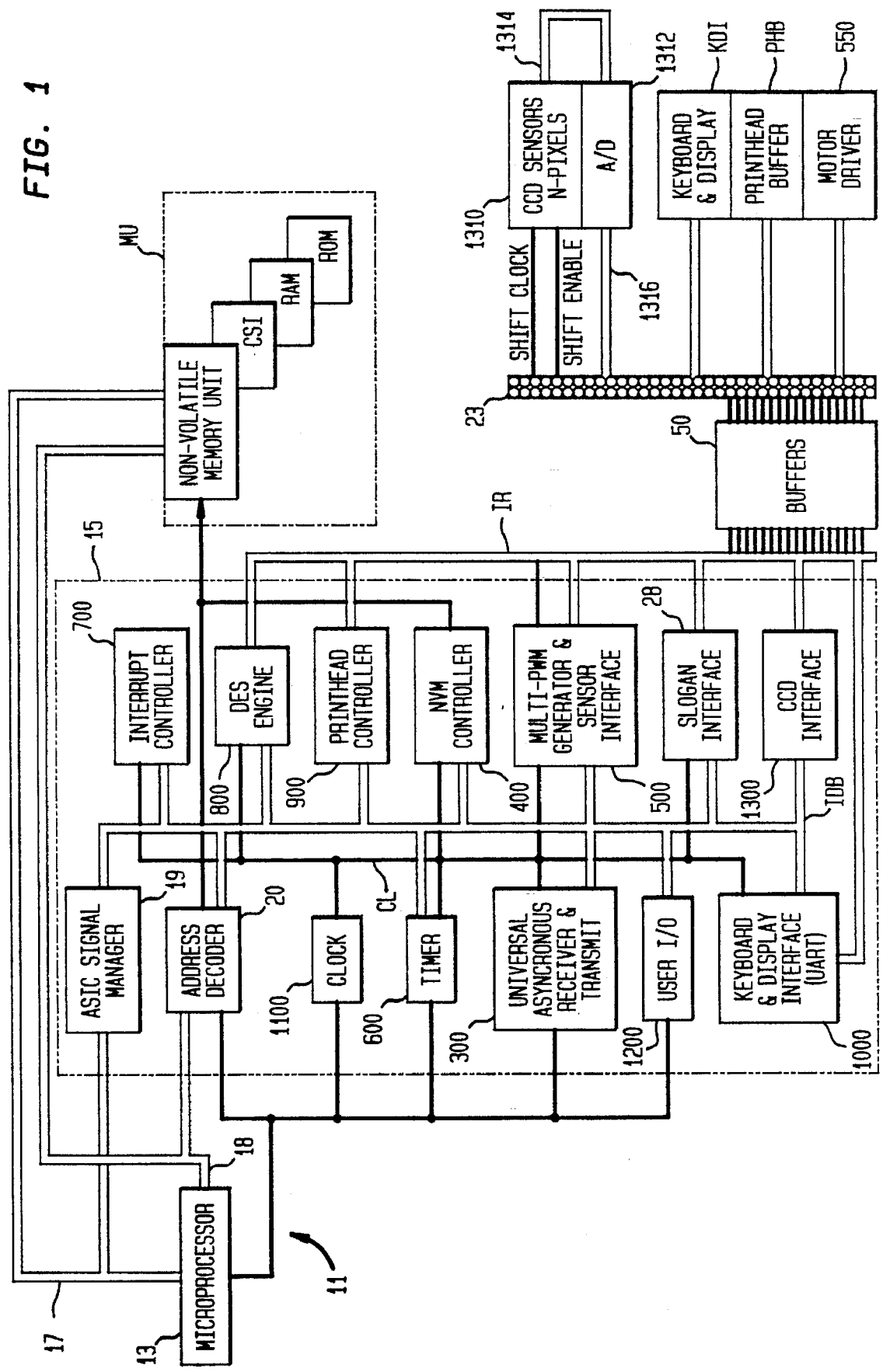
FIG. 1 is a schematic of a microcontroller system having a programmable ASIC for controlling the operation of a thermal printing electronic postage meter in accordance with the present invention.

Referring to FIG. 1, a microprocessor control system, generally indicated as 11, which is preferably intended to control a thermal printing postage meter (not shown), is comprised of a microprocessor 13 in bus 17 and 18 communication with an application specific integrated circuit (ASIC) 15 and a plurality of memory units (MU). The ASIC 15 is comprised of a number of integrated circuits, for example, ASIC signal manager 19, address decoder 20, clock 1100, timer module 600, UART module 300, user I/O 1200, keyboard and display interface 1000, interrupt control 700, print head controller module 900, encryption and decryption engine 800, memory controller 400, multi-PWM generator and sensor interface 500, charge coupled device interface 1300 and a slogan interface 200. It should be appreciated that it is within the contemplation of the present invention that the IC modules which make up the ASIC 15 may vary and that the modules here identified are intended to illustrate the preferred embodiment of the invention.

The ASIC has an internal data bus (IDB) and a plurality of control lines CL. Certain of the modules are in communication with a buffer 50 via the internal bus IB. The buffer 50 is in bus communication with a coupler 23. The coupler 23 is in communication with various meter devices, such as, the key board display KDI, print head buffer/driver PHB and motor drivers 550 which drive respective motors 552 and CCD 1310. In FIG. 1, the bus lines IDB and IB, and control lines CL are depicted in simplified manner for the purpose of clarity.

Figure 2:
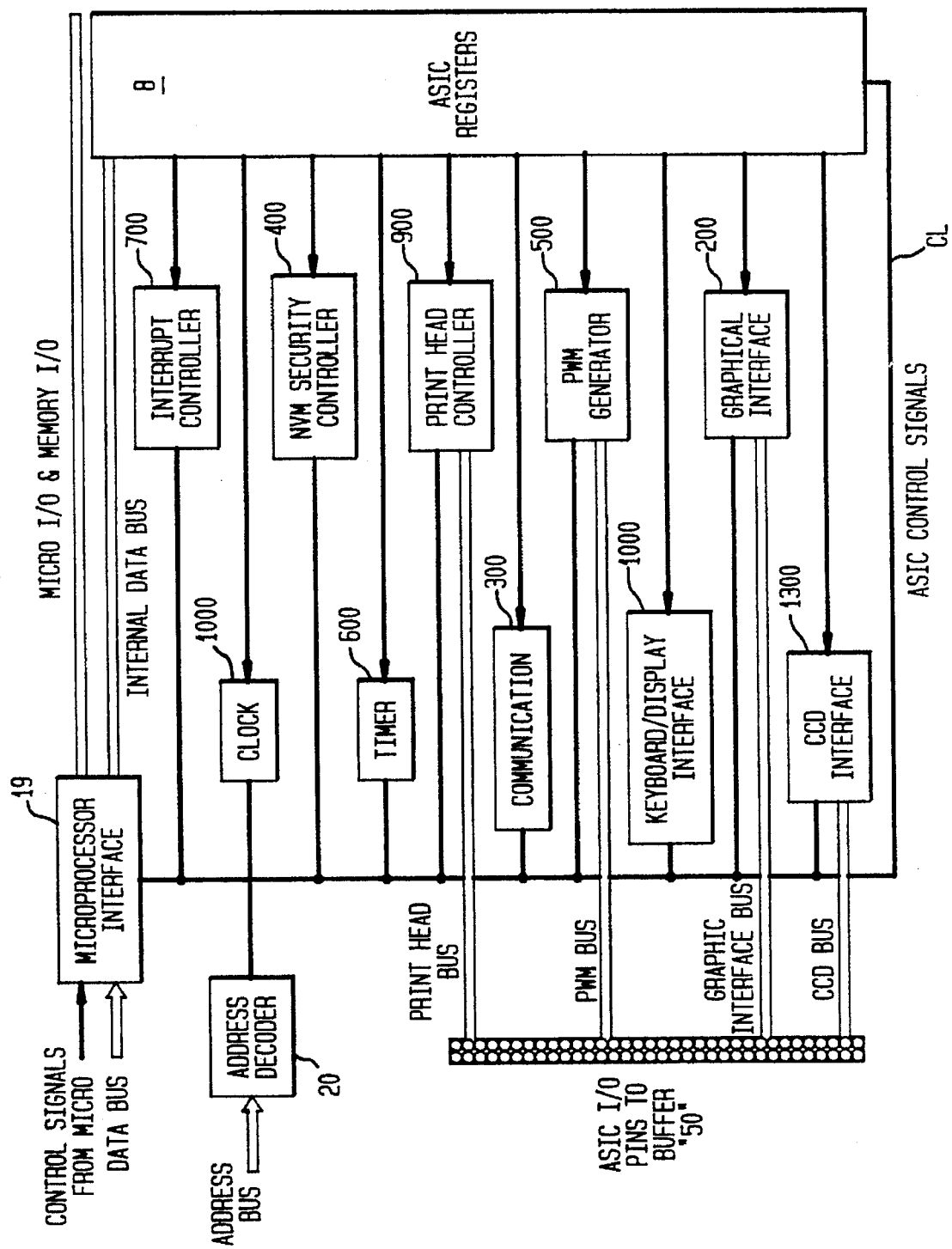
FIG. 2 is a schematic of an ASIC in accordance with the present invention.

Referring to FIGS. 1 and 2, the microprocessor 13, in the preferred embodiment, is a Motorola Model MC68EC000 which passes the control signals between the microprocessor 13 and the microprocessor interface circuit 19 of the ASIC along the I/O bus IR. The control system address bus is received by the ASIC address decoder 20. In response to particular addresses from the microprocessor, the address decoder generates the necessary control signals on the internal ASIC control bus CL for enabling the respective modules in accordance with the address instruction from the microprocessor 13. Low order data from the system data bus 17 is received by the interface 19 and placed on the internal data bus to be placed in the ASIC registers 8 when enabled by the address decoder is in response to address instructions from the microprocessor. The data placed in the ASIC registers 8 are the operating parameters for the respective modules and accessed by the respective module when the respective module has been enabled by the address decoder 20. A more complete description of the microprocessor control system is presented in U.S. patent application Ser. No. 08/163,629, entitled "Control System For An Electronic Postage Meter Having A Programmable Application Specific Integrated Circuit", filed Dec. 9, 1993, issued on Sep. 3, 1996 as U.S. Pat. No. 5,552,991 commonly assigned and herein incorporated by reference.

Figure 3:
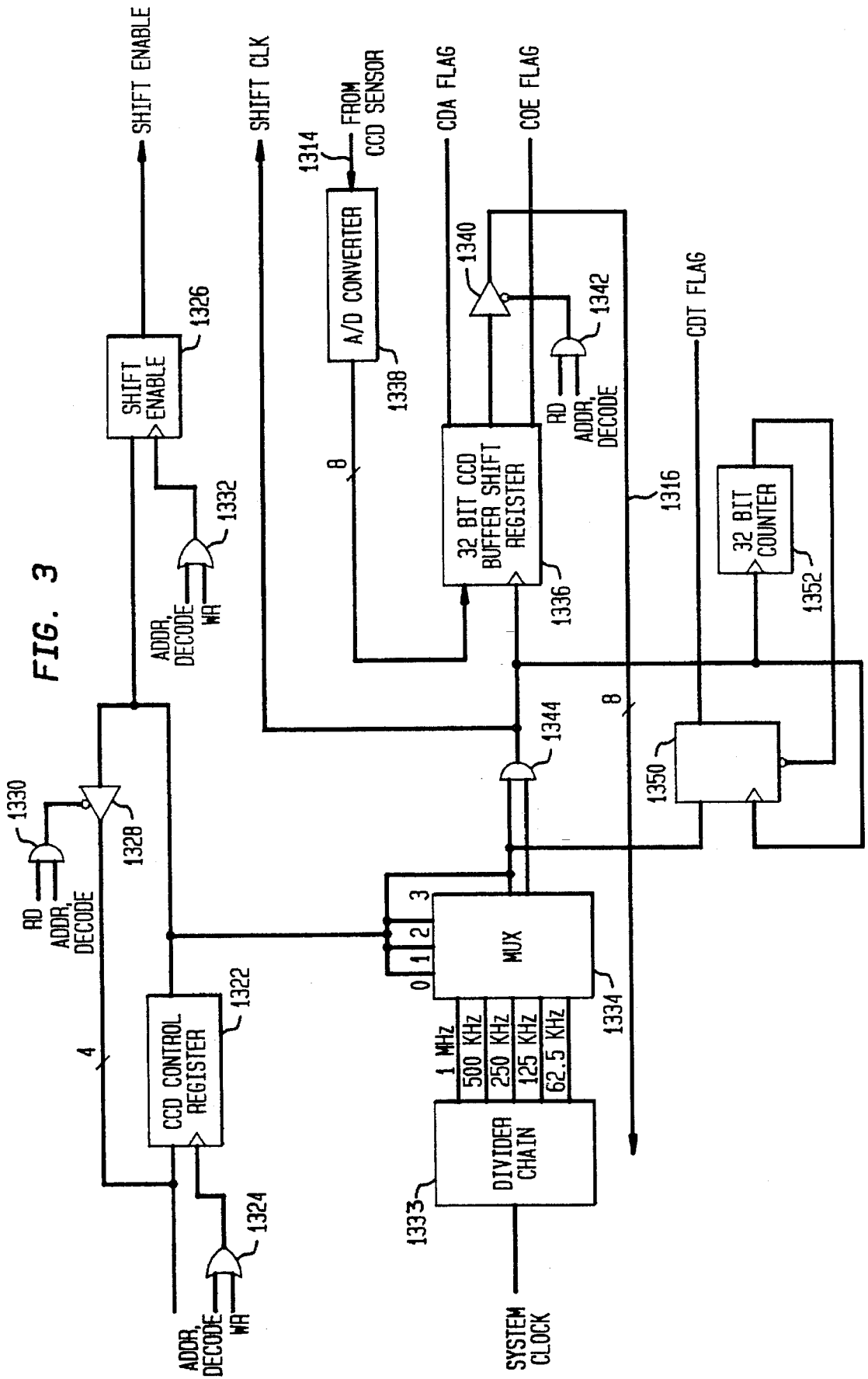
FIG. 3 is a discrete logic schematic of a CCD interface control module in accordance with the present invention.

Referring to FIG. 3, the CCD module is comprised of an CCD control register 1322 which receives input from the internal data bus IDB of the ASIC 13 when write enabling control signal from the address controller 20 is present through an OR gate 1324. The output control bits (b0, b1, b2) from the CCD control register 1322 are directed to a multiplexer 1334, which depending on the state of the output control bits (b0, b1, b2), selects one of the input shift clock frequencies (1MHz, 500KHz, 250KHz, 125KHz or 62.5KHz). The shift clock frequencies are provided to a divider chain 1333 which may be any suitable time division circuit. The output of the multiplexer 1334 along with one of the control bits (b4) from the CCD control register 1332 is directed to an AND gate 1344. The output from the AND gate 1344 then provides the selected shift clock signal to the CCD sensor 1310.

The output from the control register 1322 is also directed to a shift enable flip-flop 1326. The output from the shift enable flip-flop 1326 provides the shift enable signal to the CCD sensor 1310. Write enabling of the shift enable flip-flop 1326 is provided through an OR gate 1332 in response to a control signal from the address decoder 20. Output from the CCD sensor 310 is directed, via external bus 1314 to a A-to-D converter 1338 and, from there, to a 32 bit CCD buffer shift register 1336.

Reading data from the CCD buffer shift register 1336 is enabled through a gate 1340, which gate 1340 is enabled by the presence of a control signal from the address decoder 20 and a read control signal from the microprocessor. It is noted that a read of the CCD control registers can be effectuated by a control signal from the address decoder 20 and a read control signal from the microprocessor being presented to the input of an AND gate 1330. The output of the AND gate 1330 enables a gate 1328 to place the CCD control register 1322 states on the internal bus of the ASIC.

In operation, the CCD sensor interface 1300 generates a programmable shift pixel clock as described above and a shift enable signal to a CCD sensor device 1310. The buffer 1336 shifts 8-bits at a time to allow collection of pixel information from the CCD sensor device and to transfer them to a memory. The data transfer pulse is fixed for 2048 effective pixels from the CCD sensor device 1310. While the shift enable pulse is activated, an CCD data transfer (CDT) flag is set by enabling of the flip-flop 1350. The start-shift-clock command from the address decoder to the OR gate 1322 is entered, the shift enable pulse is activated from the disabled state, indicating that the shift enable is in process, followed by 2086 shift clock. At the end of the 2086 shift clocks counted the 32-bit counter, the shift enable pulse is disabled, indicating that the data transfer is completed.

Once the 32-bit buffer 1336 is filled, the CCD interface circuit sets a CCD data available (CDA) flag. The CDA flag is cleared when the processor accesses the 32-bit buffer 1336. If the 32-bit buffer 1336 has not been accessed by the processor before the next data byte is available, a CCD overrun error (COE) flag is set. The COE flag is cleared after the processor acknowledges the flag. At the end of the 2086 shift clocks, the CDT flag is cleared indicating the data transfer is completed. It should be understood that the flags CDT, COE and CDA are received in a conventional register which is accessible by the microprocessor 12 in any suitable conventional manner.

The above description represents the preferred embodiment and should not be viewed as limiting. The scope of the invention is presented in the appendix claims.

What is claimed is:

1. An improved control system for controlling the operation of a charge coupled device, said operation of said charge coupled device being responsive to a shift clock signal of a given frequency and a shift enable signal, wherein said improvement comprises:

said control system having means for generating a plurality of shift clock signals, each of said shift clock signals having a different frequency, register means for storing a plurality of control bits corresponding to said plurality of shift clock signals, respectively, switching means for selecting one of said shift clock signals in response to the state of said control bits and directing said selected shift clock signal to said charge coupled device, and means for generating said shift enable signal and directing said shift enable signal to said charge coupled device concurrently with the presence of said selected shift clock signal.

2. An improved control system for controlling the operation of a charge coupled device as claimed in claim 1, further comprising, shift buffer means for receiving data from said charge coupled device and storing data therein and for shifting data from said buffer in response to said selected shift clock signal, said shift clock signal being also directed to said shift buffer means.

3. An improved control system for controlling the operation of a charge coupled device, said operation of said charge coupled device being responsive to a shift clock signal of a given frequency and a shift enable signal, wherein said improvement comprises:

said control system including a program memory having a control program stored therein, processor means responsive to said control program for generating a plurality of control bits in accordance with said control program and a plurality of control signals in accordance with said control program;

control register means for storing selected ones of said control bits in response to a first one of said control signals;

means for generating a plurality of shift clock signals, each of said shift clock signals having a different frequency, said shift clock signals corresponding to said plurality of control bits, respectively;

switching means for selecting one of said shift clock signals in response to the state of said control bits and directing said selected shift clock signal to said charge coupled device; and, means for generating said shift enable signal and directing said shift enable signal to said charge coupled device concurrently with the presence of said selected shift clock signal.

4. An improved control system for controlling the operation of a charge coupled device as claimed in claim 3, further comprising, shift buffer means for receiving data from said charge coupled device and storing data therein and for shifting data from said buffer in response to said selected shift clock signal, said shift clock signal being also directed to said shift buffer means.

5. An improved control system for controlling the operation of a charge coupled device as claimed in claim 3 wherein said processor means includes a programmable microprocessor, an address decoder, a data bus and address bus, said data bus being connected to said microprocessor and said control register means, said address bus being connected to said microprocessor and said address decoder, wherein, said microprocessor is programmed by said control program to place said control bits on said data bus and generate a first address on said address bus which in response thereto said address decoder generates a first control signal enabling said control register means to store said control bits, and wherein said microprocessor is programmed by said control program to generate a second address on said address bus which in response thereto said address decoder to generate a second control signal enabling said means for generating said shift enable signal.

6. An improved control system for controlling the operation of a charge coupled device as claimed in claim 5, further comprising, shift buffer means for receiving data from said charge coupled device and storing data therein and for shifting data from said buffer in response to said selected clock signal, said shift clock signal being also directed to said shift buffer means, said shift buffer means being enabled to shift data from said shift buffer in response to a third control signal from said address decoder in response to a third address from said microprocessor.

7. An improved control system for controlling the operation of a charge coupled device, said operation of said charge coupled device being responsive to a shift clock signal of a given frequency and a shift enable signal, wherein said improvement comprises:

said control system including a program memory having a control program stored therein, processor means responsive to said control program for generating a plurality of control bits and a plurality of control signals;

control register means for storing selected ones of said control bits in response to a first one of said control signals;

means for generating a plurality of shift clock signals, each of said shift clock signals having a different frequency said shift clock signals corresponding to said plurality of control bits, respectively;

switching means for selecting one of said shift clock signals in response to the state of said control bits and directing said selected shift clock signal to said charge coupled device;

means for generating said shift enable signal and directing said shift enable signal to said charge coupled device concurrently with the presence of said selected shift clock signal;

said processor means includes a programmable microprocessor, an address decoder, a data bus and address bus;

said data bus being connected to said microprocessor and said control register means, said address bus being connected to said microprocessor and said address decoder;

wherein, said microprocessor is programmed to place said control bits on said data bus and generate a first address on said address bus which in response thereto said address decoder generates a first control signal enabling said control register means to store said control bits;

wherein said microprocessor is programmed to generate a second address on said address bus which in response thereto said address decoder to generate a second control signal enabling said means for generating said shift enable signal; and shift buffer means for receiving data from said charge coupled device and storing data therein and for shifting data from said buffer in response to said selected clock signal, said shift clock signal being also directed to said shift buffer means, said shift buffer means being enabled to shift data from said shift buffer in response to a third control signal from said address decoder in response to a third address from said microprocessor.

* * * * *